United States Patent [19]
Davis

[11] Patent Number: 5,134,851
[45] Date of Patent: Aug. 4, 1992

[54] FIVE CYLINDER OUTBOARD MOTOR

[75] Inventor: Richard A. Davis, Mequon, Wis.

[73] Assignee: Brunswick Corporation, Skokie, Ill.

[21] Appl. No.: 742,441

[22] Filed: Jul. 16, 1991

Related U.S. Application Data

[63] Continuation of Ser. No. 437,036, Nov. 15, 1989, abandoned.

[51] Int. Cl.⁵ .............. F02B 27/02; B63H 21/34
[52] U.S. Cl. ..................... 60/313; 440/89; 123/65 EM
[58] Field of Search ............ 440/89; 60/313, 314, 60/273, 323; 123/65 E, 65 EM, 59 B, 59 BM, 59 EC

[56] References Cited

U.S. PATENT DOCUMENTS

| | | | |
|---|---|---|---|
| 2,476,816 | 7/1949 | Carter | 123/59 B |
| 3,692,006 | 9/1972 | Miller et al. | 440/89 |
| 3,813,880 | 6/1974 | Reid et al. | 123/65 E |
| 4,381,644 | 5/1983 | Kusche | 60/313 |
| 4,484,442 | 11/1984 | Hale | 60/313 |
| 4,689,952 | 9/1987 | Arthur et al. | 60/313 |
| 4,914,911 | 4/1990 | Bertram | 440/89 |

FOREIGN PATENT DOCUMENTS

| | | | |
|---|---|---|---|
| 3603868 | 8/1987 | Fed. Rep. of Germany | 60/313 |
| 829024 | 6/1938 | France | 60/313 |

OTHER PUBLICATIONS

Popular Mechanics, Dec. 1970 pp. 56–58.

Primary Examiner—E. Rollins Cross
Assistant Examiner—Thomas Monlis
Attorney, Agent, or Firm—Lewis L. Lloyd

[57] ABSTRACT

A five cylinder two cycle outboard motor includes exhaust tuning of the five in-line cylinders. Exhaust tuning of five in-line cylinders provides increased horsepower for the five cylinder two cycle outboard motor. The five cylinder outboard motor which produces 150 horsepower achieves an ideal horsepower to number of cylinders and provides the proper horsepower size/weight size outboard motor for bass fishing and water skiing boats.

3 Claims, 4 Drawing Sheets

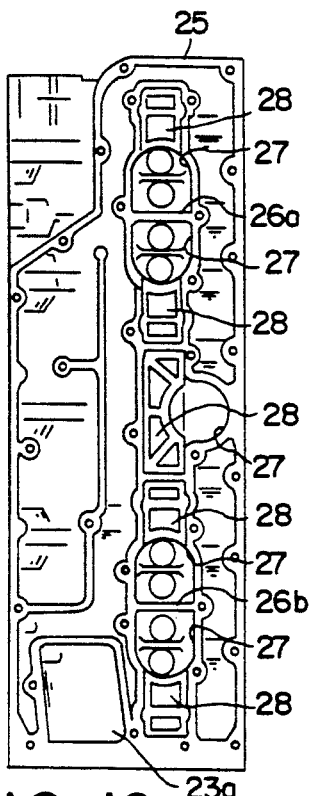
FIG. 10
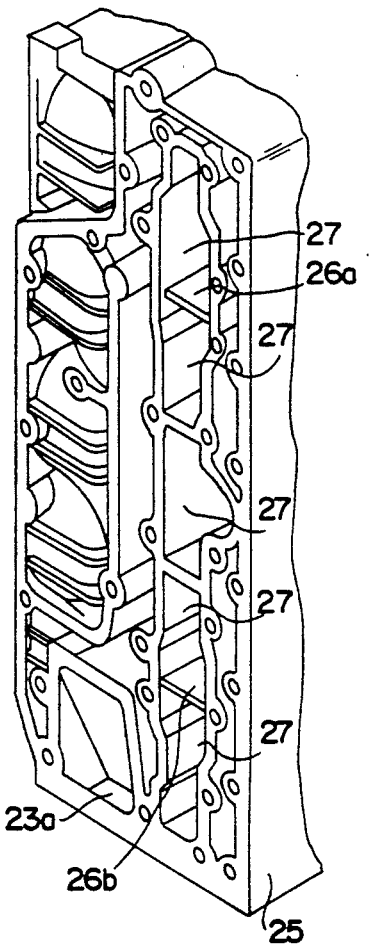
FIG. 7a
FIG. 7b
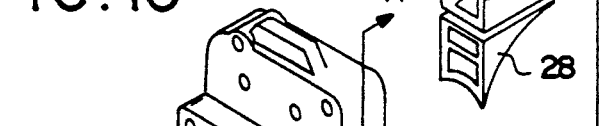
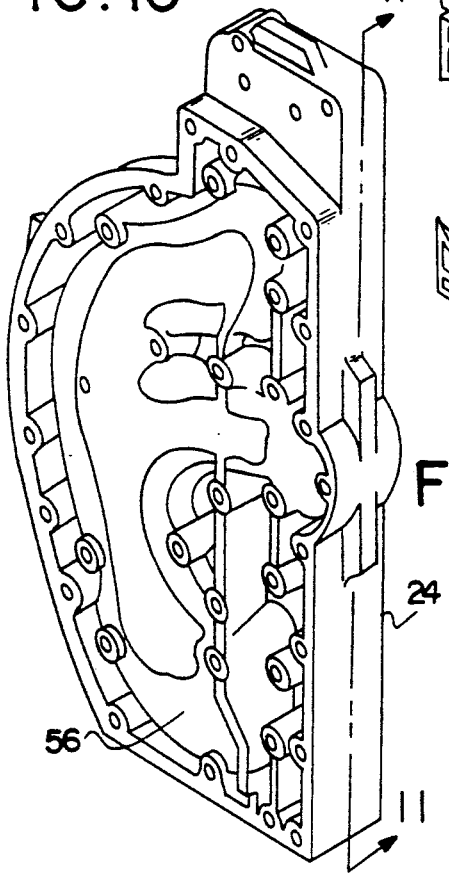
FIG. 8
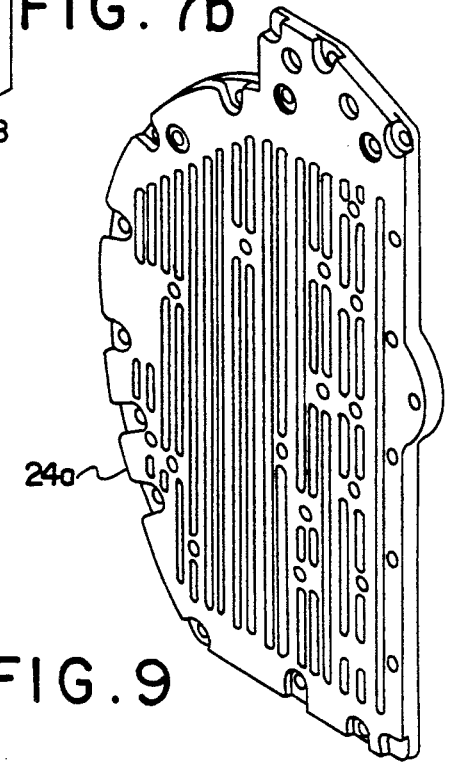
FIG. 9

FIVE CYLINDER OUTBOARD MOTOR

This application is a continuation of application Ser. No 07/437,036 filed Nov. 15, 1989, now abandoned.

BACKGROUND OF THE INVENTION

The field of the invention relates to an outboard motor and more particularly concerns a two cycle outboard motor with exhaust tuning. Two cycle outboard motors have been made with two, three, four, and six in-line cylinder configurations and with V-4, V-6 and V-8 cylinder configurations. Exhaust tuning is described in U.S. Pat. Nos. 3,692,006 to Miller et al, 3,772,887 to Ziegler, 3,808,807 to Lanpheer, 3,813,880 to Reid et al. Typically exhaust tuning issued for two or three cylinder combinations. Where outboard motors have six cylinders they are tuned in a three cylinder combination.

SUMMARY OF THE INVENTION

In the present invention a five cylinder two cycle outboard motor includes exhaust tuning of the five in-line cylinders. Exhaust tuning of five in-line cylinders provides increased horsepower for the five cylinder two cycle outboard motor. A five cylinder outboard motor which produces 150 ISO Propshaft Horsepower achieves an ideal horsepower to number of cylinders and provides the proper horsepower size-weight outboard motor for bass fishing and water skiing boats.

BRIEF DESCRIPTION OF THE DRAWINGS

FIG. 7a is an exploded perspective view of the exhaust side of the engine block for the outboard motor shown in FIG. 1.

FIG. 7b is an exploded perspective view of the exhaust filler members which are inserted within the engine block exhaust outlets of the engine block shown in FIG. 7a.

FIG. 8 is an exploded perspective view of the exhaust manifold which attaches to the exhaust side of the engine block shown in FIG. 7a after the exhaust filler members shown in FIG. 7b are inserted.

FIG. 9 is an exploded perspective view of the exhaust manifold cover which attaches to the exhaust manifold of FIG. 8 to provide a water jacket therein.

FIG. 10 illustrates the exhaust side of he engine block of the outboard motor of FIGS. 1 and 2 showing the partitioned block with exhaust filler members.

DESCRIPTION OF THE PREFERRED EMBODIMENT

Figure 1:
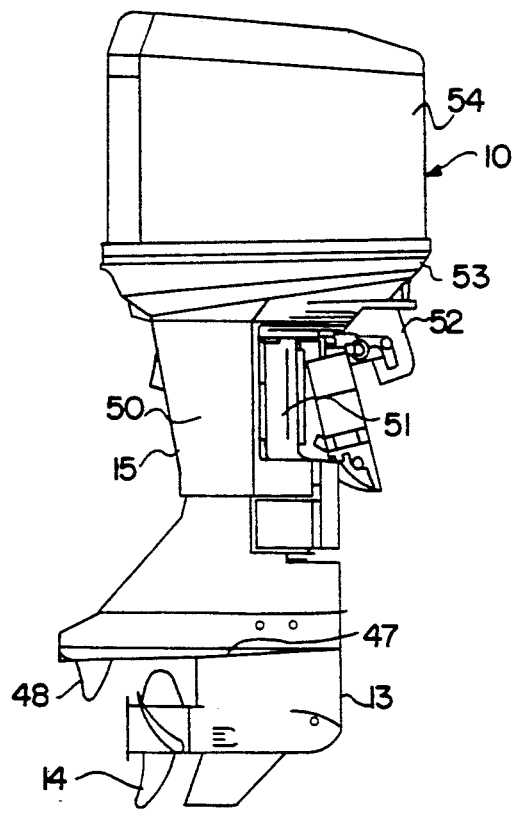
FIG. 1 is a side elevation of the two cycle five cylinder outboard motor of the invention.
Figure 4:
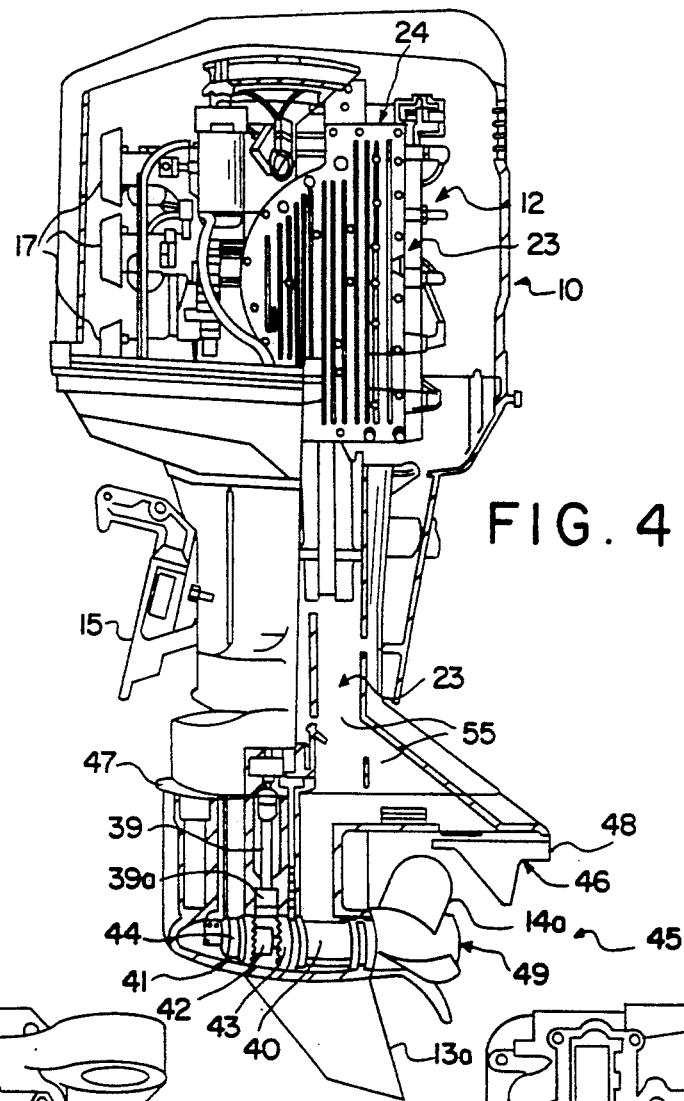
FIG. 4 is a broken away side view of the outboard motor shown in FIG. 1.

A two cycle outboard motor 10 having 5 in-line cylinders 11 is shown in FIGS. 1 and 4. The outboard motor 10 includes a power head or engine 12, a lower unit 13 driving a propeller 14 and a midsection 15 between the engine 12 and the lower unit 13.

The 5 cylinder outboard motor 10 uses a two cycle engine 12. The two cycle engine 12 provides a powerstroke on each revolution of the crankshaft as is known. For ease of understanding, the two cycle five cylinder engine 12 is shown schematically in FIGS. 2 and 3. Air/fuel mixture 16 enters each cylinder 11 of the engine 12 through a carburetor 17 passing into the crankcase 18 of the engine 12. The two cycle engine 12 utilizes the piston 19 as a valve to open and close the intake port 20 and exhaust port 21. When the piston 19 for one cylinder 11 on a down stroke exposes or opens a passageway connecting between an intake port(s) in the cylinder wall with the crankcase (for that cylinder only), the charging air/fuel mixture 16 enters the enclosed cylinder volume. The piston also on a down stroke exposes or opens an exhaust port connecting to the exhaust system. The air/fuel mixture 16 entering the cylinder volume assists in purging the exhaust gases. Both the intake and exhaust ports 20 and 21 are closed by the piston 19 on the upstroke and the air/fuel mixture is compressed into the combustion chamber where it is exploded/fired.

Figure 2:
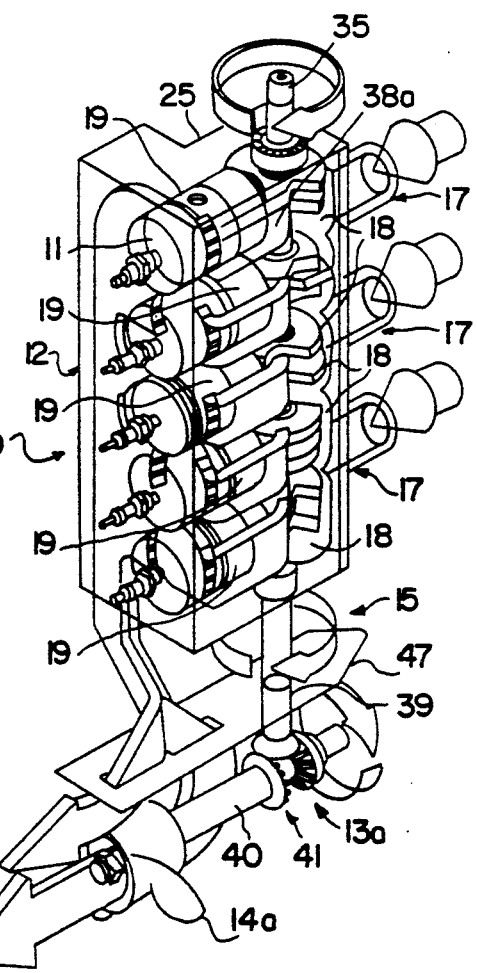
FIG. 2 is a schematic illustration of the outboard motor shown in FIGS. 1 and 2 showing the flow of the intake air-fuel mixture and the exhaust dual path outlet flow.
Figure 3:
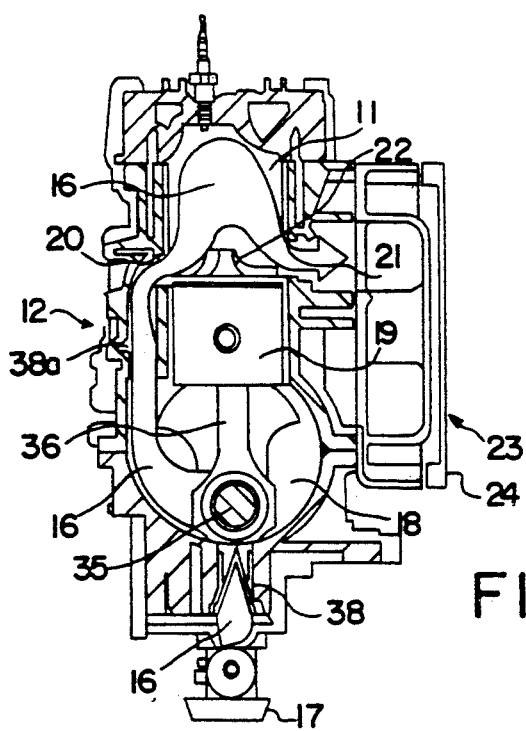
FIG. 3 is a schematic illustration of one cylinder of the outboard motor shown in FIG. 2 showing the cross flow path through the cylinder from the flowing of the intake air-fuel mixture into the crankcase, through the cylinder and out the exhaust.

Referring to FIG. 2, the five in-line cylinders 11 are supplied by three carburetors 17. The cylinders 11 are numbered 1 through 5 from the top down. Cylinders 1 and 2 are supplied by the top carburetor 17, cylinder 3 is supplied by the middle carburetor 17 and cylinders 4 and 5 are supplied by the bottom carburetor 17. As shown schematically in FIG. 3, each of the cylinders 11 have a flow there through which is called cross-flow. Cross flow is where the air/fuel mixture flows across the cylinder from one side to he other; that is, the intake port 20 is on one side of the cylinder 11 and the exhaust port 21 is on the other side of the cylinder 11 as best shown in FIG. 3. The piston 19 for cross flow usually includes a top deflector 22 to better guide the path of the air/fuel mixture 16 in and through the cylinder volume. Each of the five cylinders 11 exhaust into an exhaust system 23. The exhaust system 23 which includes an exhaust manifold 24 which is mounted to the engine block 25 will be fully described. The exhaust manifold 24 provides the pulse tuning of cylinder pairs as will be described.

In a engine having two cylinder operation, the tuning of the exhaust system 23 assures combustion of the air/fuel mixture or charge within the combustion chamber, assures the exit or exhaust of the combustion products and achieves horsepower output and torque output of the engine 12 across a broad range of engine speed. The exhaust system 23 of a two cycle engine 12 with pulse tuning has significant effect on the horsepower of a two cycle engine. Without exhaust tuning air/fuel mixture of the incoming charge flows out through the scavenging proves with the exhaust waste products.

In exhaust pulse tuning of the two cycle engine 12 an exhaust pulse or wave is formed from an exhausting cylinder 11. This wave (which is not the same thing as the exhaust itself) travels as an acoustical pulse or series of pulses through the exhaust gases. It causes an increase in the local exhaust system pressure or another cylinder at the exhausting port thereof thereby delaying and forcing back into this other cylinder escaping air/fuel mixture. As a result there is a greater charge within the other cylinder to produce power.

On the two cycle engine 12 with 5 cylinders in-line, two cylinders will interact to pulse tune one of these cylinders. One cylinder is opening and the other cylinder is closing. These two cylinders are defined to be "tuning pairs". These two cylinders pairs are cross tuned or pulse tuned.

The interval of time in which tuning pairs of cylinders are connected through open exhaust of the first cylinder and closed exhaust of the second cylinder is sometimes referred to as valve overlap. Valve overlap is more related to four cycle engines which include actual valves, but the effect in two cycle engines between the open exhaust of one cylinder and the closed exhaust of the other cylinder is similar since the piston is the valve opening and closing these exhaust ports.

The five cylinder in-line two cycle engine 12 is vastly different than existing pulse tuned engines because the interval between power strokes is very brief for each cylinder 11. This causes the overlap period to be to long. In other words, the pulse from the first exhausting cylinder arrives too early in the exhaust scavenging process and dilutes the incoming mixture with exhaust waste products.

It is very important that the exhaust pressure pulse arrives at a proper time. This is accomplished by establishment of the length of the passageway in the exhaust manifold 24 that connects the tuning pairs. This means that the total relationship between five cylinders 11 must be determined. This means determining the firing order of the engine and further determining for this firing order which cylinders 11 are tuning pairs. The exhaust system 24 in effect optimizes the horsepower and torque versus speed curve for the 5 in-line cylinders 11 of the two cycle engine 12.

The exhaust system 23 of the 5 in-line cylinders 11 as will be described utilizes partitions 26a and 26b within the exhaust passages 27 of the engine block 25 to provide laminar outlet flow as well as to separate the exhaust gas flows into the appropriate branches of the exhaust manifold 24 as will be described. The exhaust system 23 also uses filler members or stuffer blocks 28 within the partitioned exhaust passages 27 of the engine block 25 to guide the exhaust flow in a smooth form. The stuffer blocks 28 in effect eliminate sharp edges to create the desired flow path of the exhaust gas and even more importantly the a custical flow path within these exhaust gases for the pulse tuning.

Figure 13A:
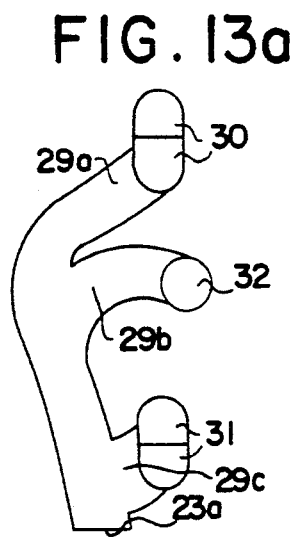
FIGS. 13a through 13c illustrate three protype envelopes or shapes for the exhaust passageway within the exhaust manifold shown in FIG. 8.
Figure 13B:
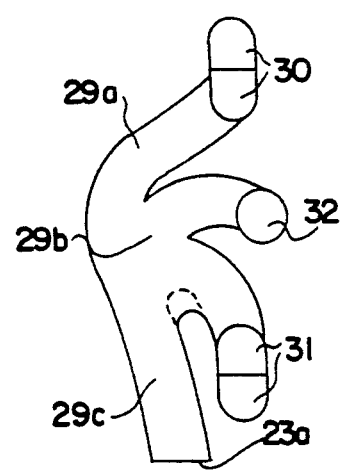
Figure 13C:
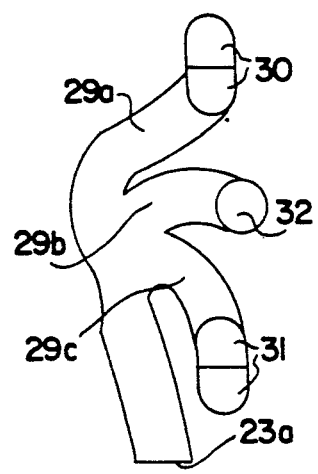

In the exhaust system 23 the exhaust manifold 24 includes a first branch 29a, a second branch 29b and a third branch 29c or three branches 29 for connecting the 5 in-line cylinders 11. The exhaust flows from cylinders 1 and 2 is consolidated into a first outlet 30 connecting to the first branch 29a; cylinders 4 and 5 are each consolidated to a second outlet 31 connecting to the third branch 29c and cylinder 3 is connected directly to the second branch 29b. FIGS. 13a through 13c illustrate three versions of an exhaust manifold each having the three branches 29a through 29c. The preferred embodiment is shown in FIG. 13a.

The engine firing order must provide an engine balance as well as determine the phasing relationship of the tuning pairs of cylinders. The firing order must use tuning pairs, therefore the cylinders 1 and 2 which have a consolidated first exhaust outlet 30 can not be tuning pairs and the cylinder 4 and 5 which have consolidated second exhaust outlet 31 can not be tuning pairs.

The engine firing order also determines the phasing of the intake of air/fuel mixture for charging of each cylinder 11. The engine 12 fires each cylinder 11 in the selected firing order. This means that the tuning cylinder of the cylinder pair and the tuned cylinder of the cylinder pair must fire in an order to have the open relationship between exhaust ports previously described. This must occur in firing order phasing for each set of the five tuning pairs.

In testing of protype engines, the firing order 1-3-5-2-4 sequence produced the most horsepower as a result of having the most similar exhaust passage lengths between tuning pairs. Still, the preferred embodiment is the firing order 1-5-2-3-4 which provides the best horsepower output and smoothness of engine operation. Other acceptable firing orders are 1-5-2-4-3, 1-5-3-2-4, 1-5-3-4-2 and 1-4-2-5-3.

The preferred 150 horsepower 2 cycle engine 12 having 5 in-line cylinders has 3.375 inch diameter bores and a total piston displacement of 128.6 cubic inches.

The engine 12 as best shown in FIG. 4 includes the engine block 25 with crankcase cover/intake manifold 33. Carburetor adapters 34, three carburetors 17 and the exhaust manifold 24. The engine 12 also includes the crankshaft 35, connecting rods 36 and pistons 19 as is known.

Figure 6:
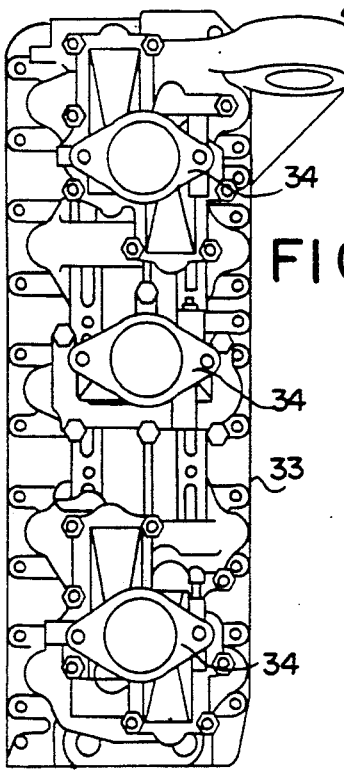
FIG. 6 is a plan view of the intake side of the engine block shown in FIG. 5 with carburetor adapters attached.
Figure 5:
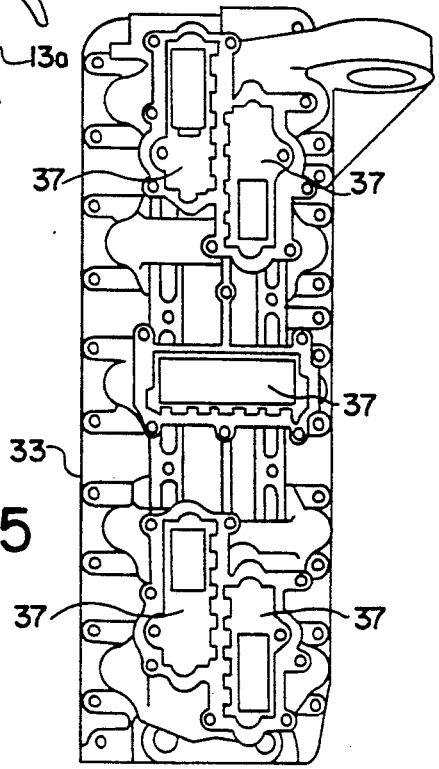
FIG. 5 is a plan view of the intake side of the engine block for the outboard motor shown in FIG. 1.
Figure 11:
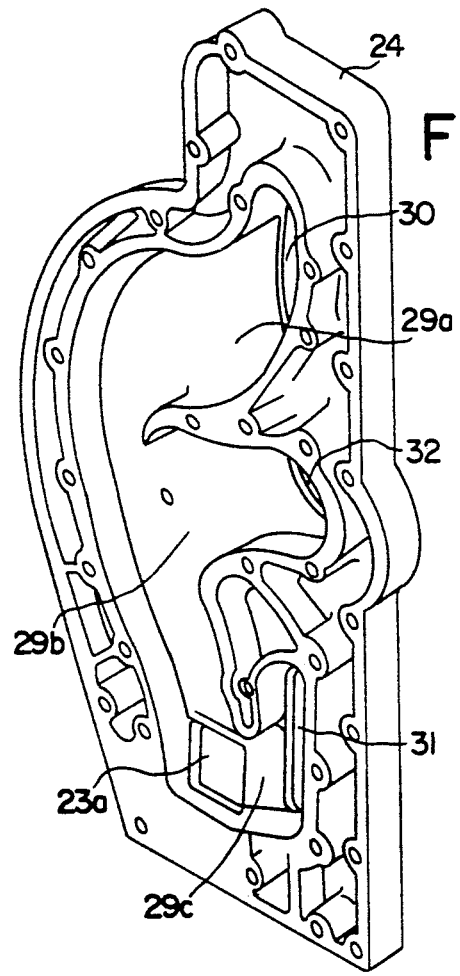
FIG. 11 is a cross section through the exploded view of the exhaust manifold of FIG. 8 on line 11—11.
Figure 12:
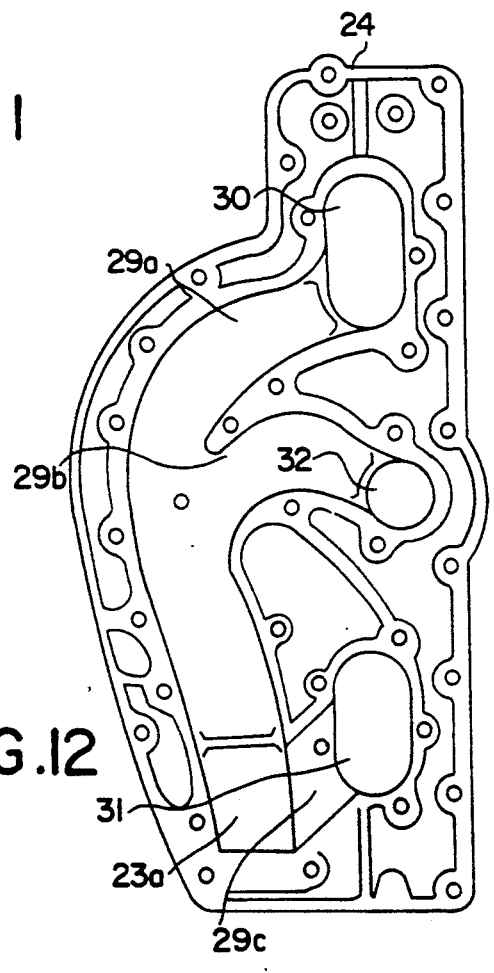
FIG. 12 is a plan view in cross section of the exhaust manifold shown in FIG. 11 attached to the exhaust side of the engine block shown in FIG. 7a with the exhaust side of the engine block including the exhaust filler members shown in FIG. 7b.

The crankcase cove/intake manifold 33 is shown in FIGS. 5 and 6. In FIG. 5 the openings 37 of the reed valve boxes 38 (shown in FIG. 3) are shown. FIG. 6 includes the carburetor adapters 34 mounted to the crankcase cover/intake manifold 33 after the reed boxes 38 are inserted. The carburetors 17 mounted to the front of the carburetor adapters 34. Intake air flows through the carburetors 17, mixes with a fuel oil mixture and then flows through the reed boxes 38 and into the crankcase 18. A transfer passage 38a connects the crankcase 18 with the intake port 20 as is known.

The connecting rods 36 connect between the crankshaft 35 and the pistons 19 as is known. The crankshaft 35 includes offsets at each cylinder 11 to phase the movement of he connecting rods 36 and pistons 19 in the desired firing order.

The lower unit 13 provides power connection from the vertical drive shaft 39 to the horizontal propeller shaft 40 with bevel gearing 41 as shown in FIGS. 2 and 4. A clutch 42 within the lower unit 13 provides shifting from a forward gear 43 for forward, the neutral, to a rearward gear 44 for reverse. A propeller 14 is mounted on the rearwardly end of the propeller shaft 40. A drive gear 39a is mounted on the end of the vertical driveshaft 39.

The lower unit 13a shown in FIG. 4 includes a dual exhaust system 45. The dual exhaust system 45 (also schematically shown in FIG. 2) connects the exhaust from the engine 12 entering the top of the lower unit 13 with a first exhaust outlet through first exhaust passageway within the lower unit to a first exhaust outlet 46 under the cavitation plate 47 formed within the trim tab 48. This first exhaust outlet 46 within the trim tab 48 is sometimes referred to as the snout location. The dual exhaust system 45 also connects the exhaust from the engine 12 entering the top of the lower unit 13 with a second exhaust outlet 49 through a second exhaust passageway within the lower unit 13 opening through the hub of the propeller 14. The exhaust system 45 is named "dual-exhaust" since the exhaust is dual routed through both the snout location and the propeller hub location. It is believed that during low boat speed the snout location provides the easiest exhaust flowpath. But, it is believed that at higher speeds the propeller hub provides the easiest exhaust path. At some speeds where minimum exhaust back pressure provides the maximum horsepower, it is believed that the dual exhaust path provides the minimum back pressure.

The midsection 15 includes the driveshaft housing 50, swivel bracket 51, transom bracket 52 and support plate 53. The driveshaft housing 50 provides passage for the vertical driveshaft 39 connecting upwardly from the lower unit 13 to the lower end of the crankshaft 35. The lower unit 13 mounts at the lower end of the driveshaft housing 50. A support plate 53 for the engine cowl 54 mounts to the top of the driveshaft housing 50 and the engine 12 mounts on the support plate 53. The engine cowl 54 encloses the engine 12 and mounts to the support plate 53 as shown in FIG. 4. The driveshaft housing 50 also includes an exhaust system passageway 55 connecting between the engine exhaust outlet 23a and the exhaust inlet into the lower unit 13.

The exhaust system 23 and exhaust manifold 24 of the engine 12 is shown in FIGS. 7a through 12. The consolidated first exhaust outlet 30 for cylinders 1-2, the consolidated second exhaust outlet 31 for cylinders 4-5 and the third single exhaust outlet 32 for cylinder 3 are shown. The outlet 1-2 includes a first partition 26a and the outlet 4-5 includes a second partition 26b.

FIGS. 7a, 7b, 8 and 9 show the exhaust side of the engine block 25, the stuffer blocks 28 and the exhaust manifold 24 with exhaust manifold cover 24a. FIG. 10 shows the stuffer blocks 28 inserted within the engine block 25. The exhaust manifold 24 includes as a hollow part therein the three branches 29a through 29b of the exhaust passages. The exhaust manifold 24 shown in FIGS. 11 and 12 by the cut-a-way on line 11—11 shows the three branches 29a through 29b and their connections with the first, second and third outlets 30, 31 and 32. FIG. 8 shows the water jacket cavity 56 exterior to the exhaust manifold 24. FIG. 9 shows the cover 24a which attaches to the outside of the exhaust manifold 24 to enclose the water jacket cavity 56.

It is noted that the length of the tree branch passageways 29a, 29b and 29c for the pulse tuned pairs in the two cycle engine 12 having 5 cylinders 11 require a length where the tuned and tuning cylinder pairs are spaced. The exhaust passage tuning length between tuning pairs is greater than the direct or shortest length between two adjacent cylinders. This occurs for all five cylinder pairs.

In the preferred embodiment shown in FIG. 13a, the tuning pairs are cylinders 5 and 1, cylinders 4 and 3, cylinders 3 and 2, cylinders 2 and 5 and cylinders 1 and 4. The lengths are the lengths between the tuned cylinder pairs as connected through the tree branch passageways 29a, 29b and 29c.

While embodiments and application of the invention have been shown and described, it would be apparent to those skilled in the art that modifications are possible without departing from the inventive concepts herein. Therefore, the invention is not to be restricted other than by the scope and equivalency of the following claims.

I claim:

1. An outboard motor having a two cycle five cylinder in line engine comprising
   an engine block means including five pistons, said engine block means having cross flow induction with an intake inlet on one side of each of said pistons and an exhaust outlet on the other side of each of said pistons,
   a midsection having a midsection exhaust passageway therein, and
   a lower unit having a lower unit exhaust passageway therein, said lower unit mounted to said midsection with said midsection exhaust passageway connecting with said lower unit exhaust passageway,
   an exhaust manifold mounted to said engine block, said exhaust manifold including an exhaust tuning passageway therein, said exhaust tuning passageway including three exhaust tuning branch passageways, said exhaust tuning passageway connecting all five of said exhaust outlets in said engine with said exhaust passageway in said midsection.

2. The outboard motor defined in claim 1 wherein said three exhaust tuning branch passageways include a first branch connecting with a first and second adjacent in line cylinders, a second branch connecting with a third in line cylinder, and a third branch connecting with a fourth and fifth adjacent in line cylinders.

3. The outboard motor defined in claim 2 wherein said engine block includes a consolidated exhaust outlet for two adjacent in line cylinders, said consolidated exhaust outlet connecting with a branch passageway.

* * * * *